(12) United States Patent
Shin

(10) Patent No.: US 7,273,218 B2
(45) Date of Patent: Sep. 25, 2007

(54) TORSION BEAM AXLE-TYPE REAR SUSPENSION

(75) Inventor: Dong-Woo Shin, Jeonlabuk-do (KR)

(73) Assignee: Hyundai Mobis Co., Ltd., Yongin-Shi (KR)

( * ) Notice: Subject to any disclaimer, the term of this patent is extended or adjusted under 35 U.S.C. 154(b) by 450 days.

(21) Appl. No.: 11/003,432

(22) Filed: Dec. 6, 2004

(65) Prior Publication Data
US 2006/0033300 A1 Feb. 16, 2006

(30) Foreign Application Priority Data
Aug. 10, 2004 (KR) ...................... 10-2004-0062738

(51) Int. Cl.
*B60G 9/00* (2006.01)
*B60G 3/12* (2006.01)
(52) U.S. Cl. .......................... 280/124.116; 280/124.128
(58) Field of Classification Search ......... 280/124.116, 280/124.128, 124.107, 124.13, 124.153, 280/124.165, 124.169, 124.177
See application file for complete search history.

(56) References Cited

U.S. PATENT DOCUMENTS

| | | | | |
|---|---|---|---|---|
| 4,326,734 A | * | 4/1982 | Kroniger | ............. 280/124.117 |
| 5,403,030 A | * | 4/1995 | Chun | .................. 280/124.128 |
| 6,889,989 B2 | * | 5/2005 | Park | ..................... 280/124.166 |
| 7,014,201 B2 | * | 3/2006 | Lee | ......................... 280/124.13 |
| 7,044,565 B2 | * | 5/2006 | Kang | .......................... 301/127 |
| 2005/0099060 A1 | * | 5/2005 | Choi | ........................... 301/127 |
| 2005/0173882 A1 | * | 8/2005 | Drabon et al. | ........ 280/124.107 |

FOREIGN PATENT DOCUMENTS

KR    1998-68330    4/2000

OTHER PUBLICATIONS

U.S. Appl. No. 10/329,966, filed Dec. 30, 2002.
U.S. Appl. No. 10/725,364, filed Dec. 3, 2003.
U.S. Appl. No. 10/748,244, filed Dec. 31, 2003.
English language Abstract of Korea 1998-68330.

\* cited by examiner

*Primary Examiner*—Paul N. Dickson
*Assistant Examiner*—Joselynn Y. Sliteris
(74) *Attorney, Agent, or Firm*—Greenblum & Bernstein, P.L.C.

(57) ABSTRACT

Disclosed herein is a torsion beam axle-type rear suspension, which simplifies and minimizes the shape and size of a rubber bush that prevents oversteer due to lateral force generated during a turning movement of a vehicle, by causing toe-in.

6 Claims, 2 Drawing Sheets

[FIG. 1] PRIOR ART
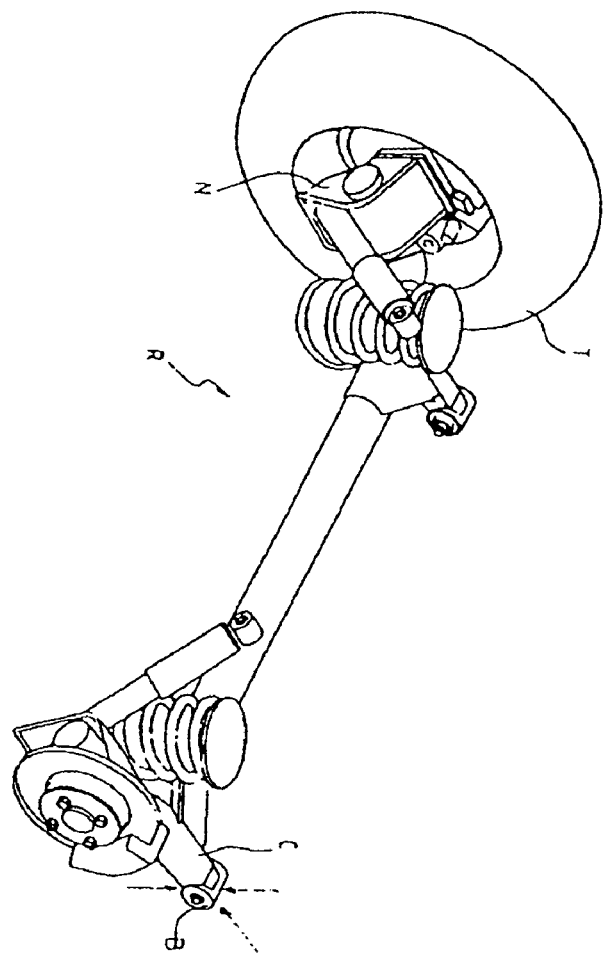
[FIG. 2] PRIOR ART
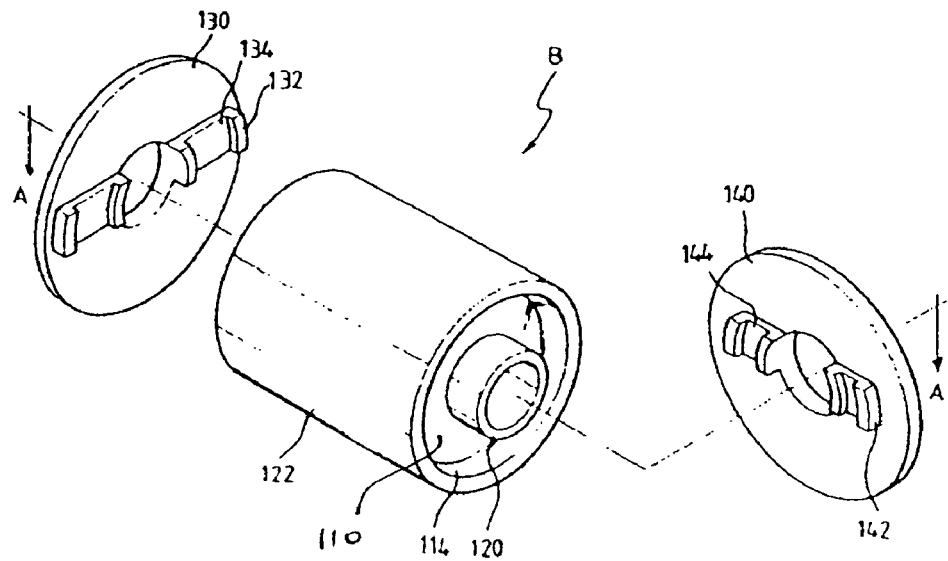

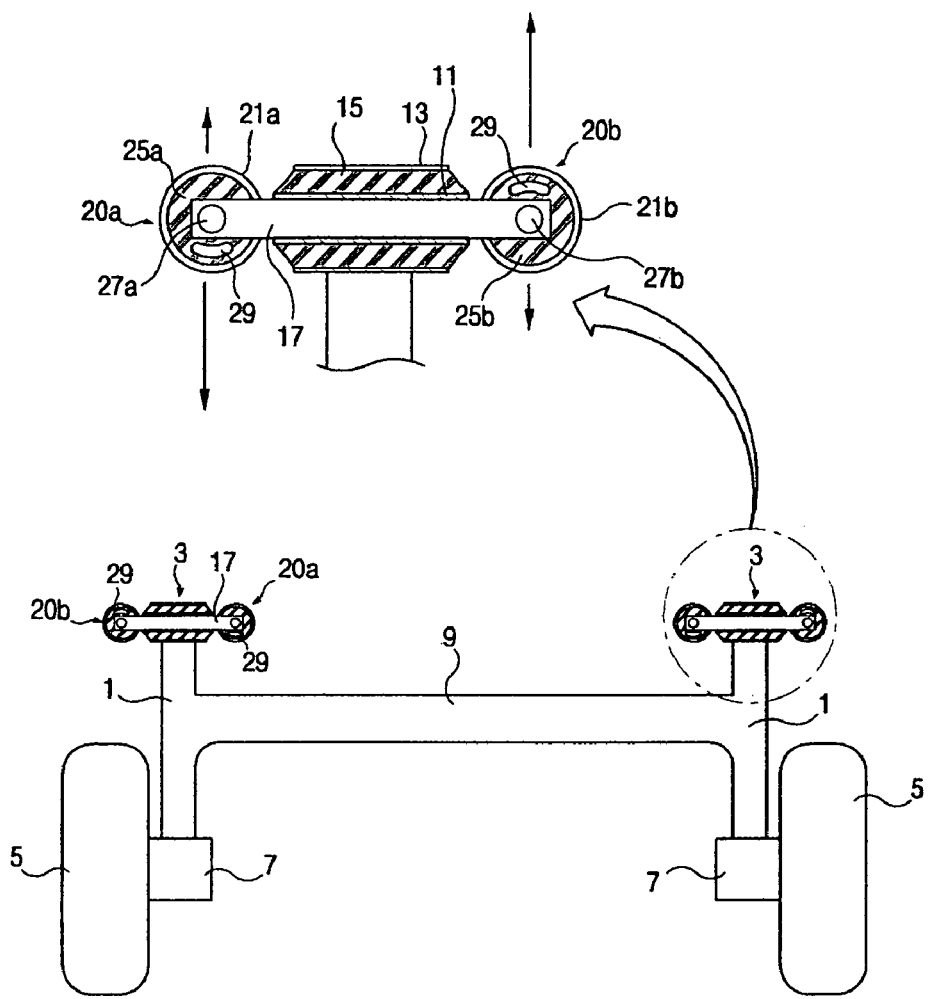
[FIG. 3]

TORSION BEAM AXLE-TYPE REAR SUSPENSION

RELATED APPLICATIONS

The present disclosure relates to subject matter contained in priority Korean Application No. 10-2004-0062738, filed on Aug. 10, 2004, which is herein expressly incorporated by reference in its entirety.

BACKGROUND OF THE INVENTION

1. Field of the Invention

The present invention relates to a torsion beam axle-type rear suspension, which simplifies the shape and minimizes the size of a rubber bush that prevents oversteer due to lateral force generated during a turning movement of a vehicle, by causing toe-in.

2. Description of the Related Art

In a conventional torsion beam axle-type suspension, when lateral force acts on a rear axle during turns, oversteer occurs due to the variation of a torsion beam, thus decreasing stability.

In order to solve the problem, a rear axle control arm for motor vehicles was proposed, which is disclosed in Korean U.M. Laid-open Publication No. 1998-68330.

According to the cited reference, the rear axle control arm is constructed as follows. That is, a control arm C is coupled to each of opposite ends of a rear axle R. A rear end of the control arm C is coupled to a knuckle N which is secured to a tire T, while a front end of the control arm C is integrated with a bush B having a rubber member 110. In order to fasten the bush B by means of bolts and nuts (not shown), a pair of support brackets (not shown) extends downwards from a vehicle body (not shown).

The bush B includes inner and outer pipes 120 and 122 made of steel, and the shock absorbing rubber member 110. Fitting slots (not shown) are provided on the left side of the rubber member 110, while an annular space 114 is provided on the right side of the rubber member 110. Further, '⊏'-shaped protruding parts 142, each of which is made of steel and has a channel 144, are provided on a left side of a right disc 140 made of steel, so that the protrusions 142 are held in the space 114 of the rubber member 110. Further, '⊏'-shaped protruding parts 132, each of which is made of steel and has a channel 134, are provided on a right side of a left disc 130 that is made of steel, so that the protruding parts 132 are supported by an outer portion of the outer pipe 122 and the fitting slots of the rubber member 110.

As such, a space is defined between the inner and outer pipes 120 and 122 of the bush B, thus preventing oversteer due to lateral force generated during a turning movement of the vehicle, by causing toe-in. Further, the bush B is advantageous in that gradient performance of a vehicle is enhanced during vertical vibration. However, it is problematic in that the bush B is complicated in structure and is thus expensive.

SUMMARY OF THE INVENTION

Accordingly, the present invention has been made keeping in mind the above problems occurring in the prior art, and an object of the present invention is to provide a torsion beam axle-type rear suspension, which is capable of preventing oversteer due to lateral force generated during a turning movement of a vehicle, using a simple and compact bush.

In order to accomplish the above object, the present invention provides a torsion beam axle-type rear suspension, including a pair of trailing arms which is provided on both sides of the rear suspension, with a front end of each of the trailing arms vibrating vertically through a horizontal shaft of a main rubber bush, a torsion beam which couples the trailing arms to each other, and lateral force resisting rubber bushes which are secured to a vehicle body and vertically oriented to opposite sides of the main rubber bush, wherein an elastic characteristic of each of the lateral force resisting rubber bushes is set such that each of bushes has a small deformation area and a large deformation area.

Such a construction is capable of preventing oversteer caused by lateral force during turns, using the simple and compact bushes.

When the elastic characteristic is set so that the small deformation area is hard and the large deformation area is soft, the torsion beam axle minimizes oversteer or achieves neutral steering.

Further, the large deformation area of each of the lateral force resisting rubber bushes is provided with a hole, thus minimizing oversteer.

Each of the lateral force resisting rubber bushes includes an inner pipe arranged in a vertical direction of the vehicle body, an outer pipe secured to the vehicle body, a rubber member interposed between the inner and outer pipes, and a vertical shaft which connects the inner pipe to the vehicle body. Preferably, an upper end of the vertical shaft is secured to the horizontal shaft of the main rubber bush.

BRIEF DESCRIPTION OF THE DRAWINGS

The above and other objects, features and advantages of the present invention will be more clearly understood from the following detailed description taken in conjunction with the accompanying drawings, in which:

FIG. 1 is a perspective view to show a conventional torsion beam axle-type rear suspension;

FIG. 2 is an exploded perspective view to show a rubber bush of FIG. 1; and FIG. 3 is a plan view to show a torsion beam axle-type rear suspension, according to a preferred embodiment of the present invention.

DESCRIPTION OF THE PREFERRED EMBODIMENTS

Hereinafter, a preferred embodiment of the present invention will be described with reference to the accompanying drawings.

FIG. 3 is a plan view to show a torsion beam axle-type rear suspension, according to the preferred embodiment of the present invention. The rear suspension includes a pair of trailing arms 1 on left and right sides thereof. A front end of each trailing arm 1 is coupled to a main rubber bush 3 so that the trailing arm 1 vibrates vertically. A rear end of each trailing arm 1 is coupled to a support member 7 which movably supports one of rear wheels 5. A torsion beam 9 is coupled at opposite ends thereof to middle portions of the trailing arms 1, so that the torsion beam 9 extends in a transverse direction of a vehicle.

The main rubber bush 3 includes an inner pipe 11, an outer pipe 13, and a rubber member 15. The inner pipe 11 extends in the transverse direction of the vehicle. The front end of each trailing arm 1 is fixed to the outer pipe 13. The rubber member 15 is interposed between the inner and outer pipes 11 and 13. A horizontal shaft 17 passes through the inner pipe 11.

Lateral force resisting rubber bushes 20a and 20b are mounted to left and right sides of each main rubber bush 3.

Each of the lateral force resisting rubber bushes 20a and 20b includes an outer pipe 21a, 21b, an inner pipe (not shown), and a rubber member 25a, 25b interposed between the outer and inner pipes, like the main rubber bush 3. Further, vertical shafts 27a and 27b are installed in the corresponding inner pipes (not shown) of the lateral force resisting rubber bushes 20a and 20b and are supported by opposite ends of the horizontal shaft 17. The outer pipe 21a, 21b is secured to a mounting bracket (not shown) of a vehicle body.

Further, a hole 29 is formed in a rear portion of the first rubber member 25a, whereas a hole 29 is formed in a front portion of the second rubber member 25b. That is, the lateral force resisting rubber bush 20a, 20b has a specified elastic characteristic such that it is hard in a small deformation area and is soft in a large deformation area.

Due to such a specified elastic characteristic, although the lateral force resisting rubber bushes are simple in shape and compact in size, oversteer caused by lateral force can be minimized.

The torsion beam axle-type rear suspension according to the present invention is not limited to the above-mentioned embodiment, and various changes and modifications may be made in the invention without departing from the spirit and scope thereof.

As described above, the present invention provides a torsion beam axle-type rear suspension, which is configured so that lateral force resisting rubber bushes each having an inner pipe, an outer pipe, a rubber member interposed between the inner and outer pipes, and a vertical shaft used to connect the inner pipe to a vehicle body, are mounted to left and right sides of a main rubber bush permitting vertical vibration of trailing arms, thus minimizing oversteer caused by lateral force, using the simple and compact lateral force resisting rubber bushes.

Further, although an external force acts on a vehicle while the vehicle is running, the vehicle is supported at two points around each rear wheel by the lateral force resisting rubber bushes, thus efficiently absorbing vibration, therefore considerably reducing noise.

What is claimed is:

1. A torsion beam axle-type rear suspension, comprising:
   a pair of trailing arms provided on both sides of the rear suspension, with a front end of each of the trailing arms vibrating vertically through a horizontal shaft of a main rubber bush;
   a torsion beam to couple the trailing arms to each other; and
   lateral force resisting rubber bushes secured to a vehicle body, and vertically oriented to opposite sides of the main rubber bush;
   wherein an elastic characteristic of each of the lateral force resisting rubber bushes is set such that each of bushes has a small deformation area and a large deformation area.

2. The torsion beam axle-type rear suspension as set forth in claim 1, wherein the elastic characteristic is set so that the small deformation area is hard and the large deformation area is soft.

3. The torsion beam axle-type rear suspension as set forth in claim 1, wherein the large deformation area of each of the lateral force resisting rubber bushes is provided with a hole.

4. The torsion beam axle-type rear suspension as set forth in claim 2, wherein the large deformation area of each of the lateral force resisting rubber bushes is provided with a hole.

5. The torsion beam axle-type rear suspension as set forth in claim 3, wherein each of the lateral force resisting rubber bushes comprises:
   an inner pipe arranged in a vertical direction of the vehicle body;
   an outer pipe secured to the vehicle body;
   a rubber member interposed between the inner and outer pipes; and
   a vertical shaft to connect the inner pipe to the vehicle body, the vertical shaft secured to the horizontal shaft of the main rubber bush.

6. The torsion beam axle-type rear suspension as set forth in claim 4, wherein each of the lateral force resisting rubber bushes comprises:
   an inner pipe arranged in a vertical direction of the vehicle body;
   an outer pipe secured to the vehicle body;
   a rubber member interposed between the inner and outer pipes; and
   a vertical shaft to connect the inner pipe to the vehicle body, the vertical shaft secured to the horizontal shaft of the main rubber bush.

* * * * *